(No Model.)

B. DÜERSTOCK.
FAUCET.

No. 288,781. Patented Nov. 20, 1883.

Attest:
P. A. Knight
Geo. Wheelock

Inventor:
Bernard Duerstock
By Knight Bros
Attys

UNITED STATES PATENT OFFICE.

BERNARD DÜERSTOCK, OF CINCINNATI, OHIO.

FAUCET.

SPECIFICATION forming part of Letters Patent No. 288,781, dated November 20, 1883.

Application filed August 24, 1883. (No model.)

*To all whom it may concern:*

Be it known that I, BERNARD DÜERSTOCK, of Cincinnati, Hamilton county, Ohio, have invented a new and useful Improvement in Faucets, of which the following is a specification.

Figure 1:
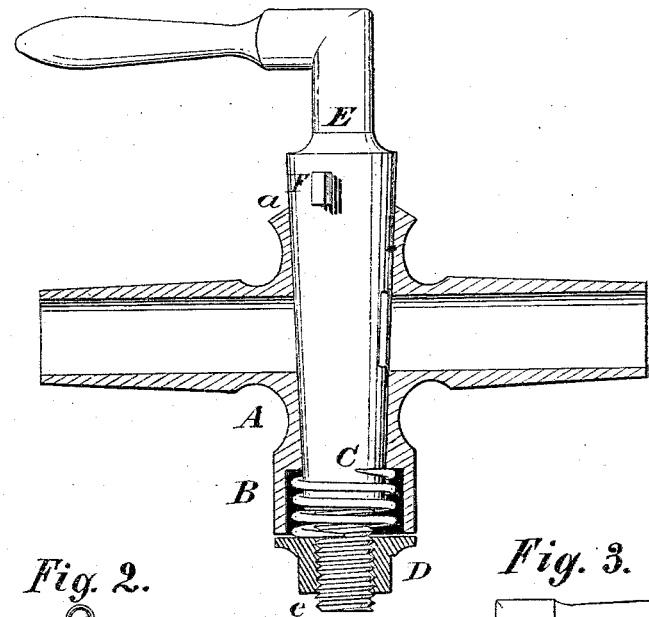
Figure 2:
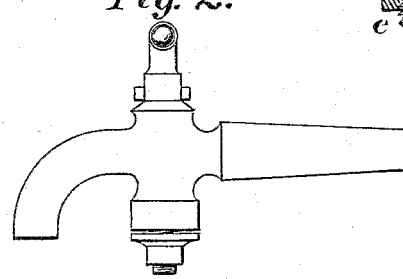
Figure 3:
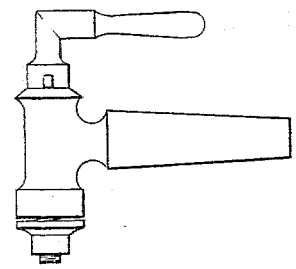

In the accompanying drawings, Figure 1 is an axial section of a faucet embodying my improvements, the plug being in elevation. Figs. 2 and 3 are external views of other forms embodying my improvements.

The faucet-body A is provided at its lower end with a chamber, B, for reception of a helical spring, C, which, bearing upward against the ceiling of said chamber and downward against the upper surface of a nut, D, that screws upon the screw-threaded extremity $e$ of the spigot E, operates to hold the said spigot down within its bearings in the faucet-body with sufficient force to prevent leakage. The crown $a$ of the faucet-body is conical, as shown, and supports a lug or rigid projection, F, from the spigot side, which, in the described association with said conical crown, makes it impossible for the said spring C to draw the spigot so forcibly down as to cause it to jam or bind within the body, and which at the same time serves as an index to show when the faucet is open or shut. The conical form of the crown $a$, in connection with the narrowness of the lower edge of the lug F, enables these parts to wear away with just sufficient celerity to compensate for the wear of the spigot within its bearings. The force of the spring can be increased or diminished at discretion by simply screwing the nut D up or down. The spring is entirely hidden from view, and also protected from dirt, by the nut D and the walls of the inclosing-chamber B.

I claim as new and of my invention—

The described combination of chambered faucet-body A B, having the conical crown $a$, the spring C, the nut D, and the spigot E, having the screw-threaded extremity $e$, and lateral projection F, substantially as set forth.

In testimony of which invention I hereunto set my hand.

BERNARD DÜERSTOCK.

Attest:
GEO. H. KNIGHT,
W. S. HOLMES.